No. 787,743. PATENTED APR. 18, 1905.
B. ELY & J. I. TAYLOR.
MOLD FOR FORMING CEMENT BUILDING BLOCKS.
APPLICATION FILED JAN. 19, 1905.

2 SHEETS—SHEET 1.

WITNESSES:
C. E. Duffey
Amos W. Hart

INVENTORS
BILLY ELY
JAMES I. TAYLOR
BY Munn & Co.
ATTORNEYS

No. 787,743. PATENTED APR. 18, 1905.
B. ELY & J. I. TAYLOR.
MOLD FOR FORMING CEMENT BUILDING BLOCKS.
APPLICATION FILED JAN. 19, 1905.
2 SHEETS—SHEET 2.
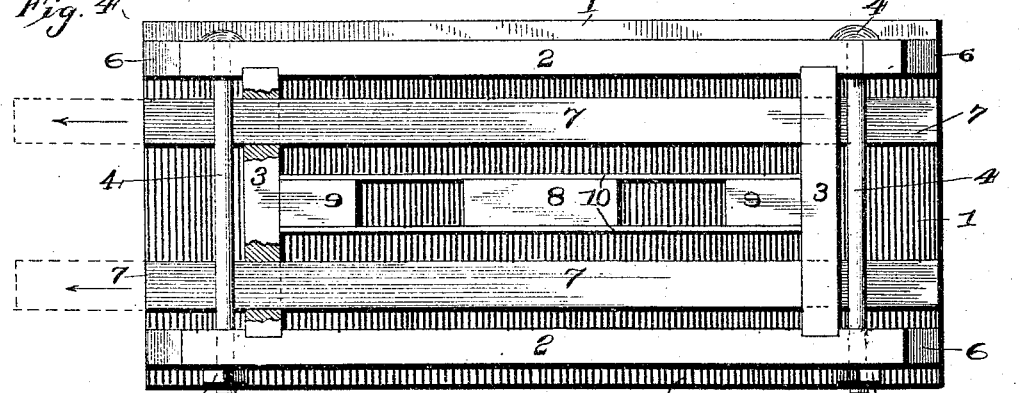
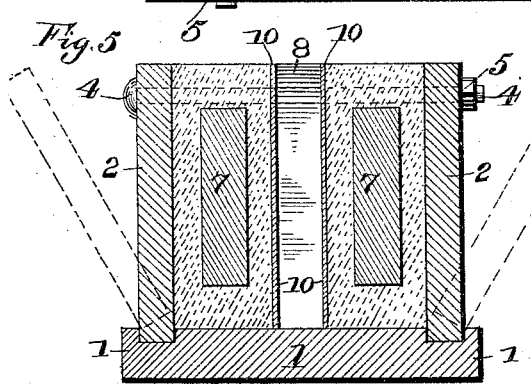
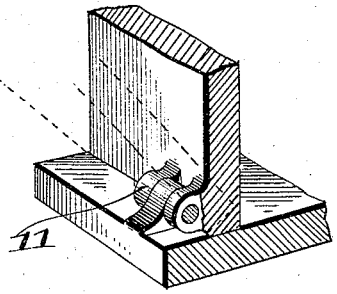
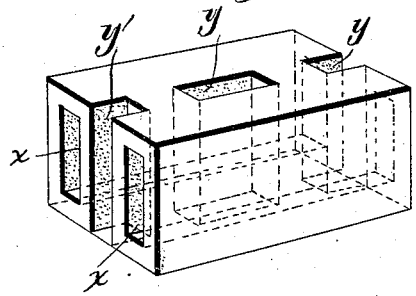
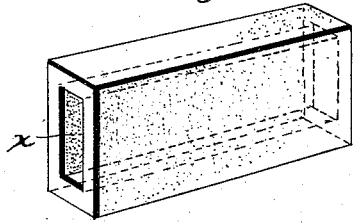
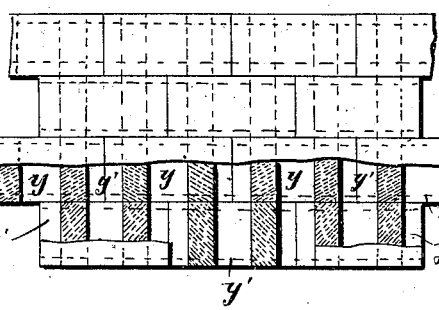
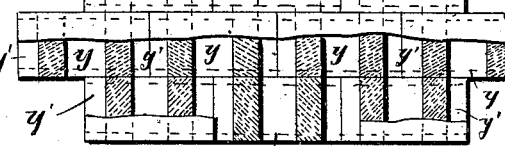
WITNESSES:
INVENTORS
BILLY ELY
JAMES I. TAYLOR
BY
ATTORNEYS No. 787,743. Patented April 18, 1905.

UNITED STATES PATENT OFFICE.

BILLY ELY AND JAMES I. TAYLOR, OF ROCK RAPIDS, IOWA.

MOLD FOR FORMING CEMENT BUILDING-BLOCKS.

SPECIFICATION forming part of Letters Patent No. 787,743, dated April 18, 1905.

Application filed January 19, 1905. Serial No. 241,754.

*To all whom it may concern:*

Be it known that we, BILLY ELY and JAMES I. TAYLOR, citizens of the United States, and residents of Rock Rapids, in the county of Lyon and State of Iowa, have invented an Improved Mold for Forming Cement Building-Blocks, of which the following is a specification.

Our invention is an improvement in knockdown or separable molds adapted for forming clay or cement building-blocks having cavities or passages, permitting circulation of air.

The invention relates particularly to the means for forming longitudinal and transverse air-passages in the molded block and also to the means for forming a thin block adapted for use as a facing or veneering for walls of buildings.

Figure 1:
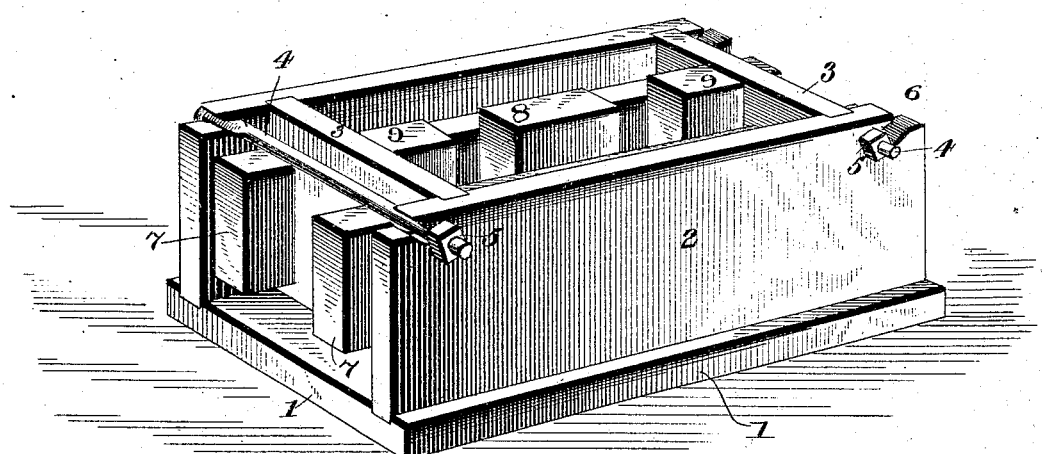
Figure 2:
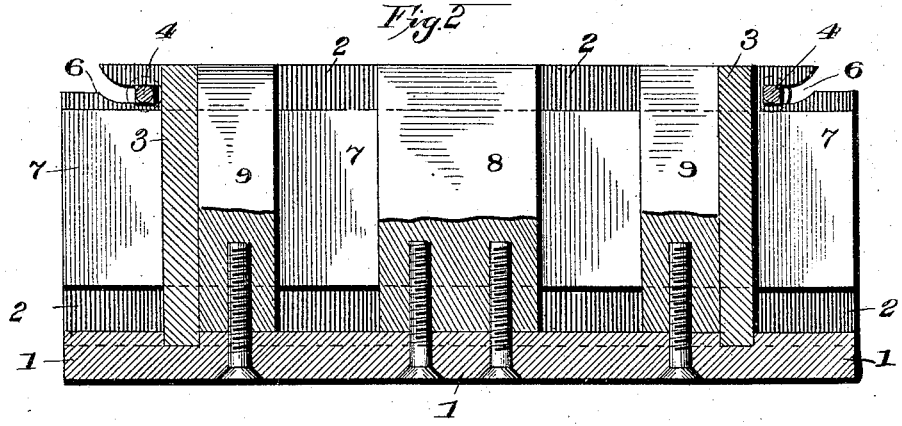
Figure 3:
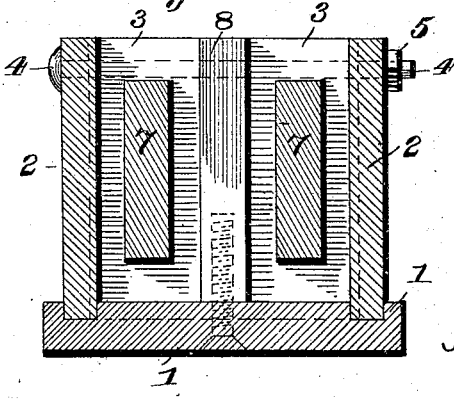

In the accompanying drawings, Figure 1 is a perspective view of our improved mold without the means required to form a facing or veneering block. Fig. 2 is mainly a central longitudinal vertical section, the upper portions of the central blocks being shown in side view. Fig. 3 is a central vertical transverse section of the mold. Fig. 4 is mainly a plan view of the mold, a portion being shown in section. Fig. 5 is a central vertical transverse section of the mold, together with the side plates, which may be employed for forming facing or veneering cement blocks. Fig. 6 is a detail section illustrating a modification of a certain feature. Fig. 7 is a perspective view of a cement block produced by the mold. Fig. 8 is a perspective view of a facing or veneering block produced by the mold. Fig. 9 is a view illustrating a wall formed of cement blocks constructed as represented in Fig. 7.

The parts of the mold are preferably made of cast-iron; but various other materials may be successfully used. The mold is rectangular and preferably oblong, as shown in Figs. 1 and 4, and is composed as to its body or outside portion of a base 1, sides 2, and ends 3, the top being left open. The base 1 is provided with longitudinal parallel grooves near its side edges to receive the lower edges of the sides 2. The latter are similarly provided with grooves at the inner sides to receive the ends 3. The sides 2 and ends 3 are held together when in use by means of screw-threaded rods 4, to which nuts 5 are applied, as shown in Figs. 1 and 4. The said rods are fitted in the notches 6, formed in the upper corners of the side pieces 2, so that the rods may be quickly inserted and removed when the nuts 5 are duly loosened. The end pieces 3 are each provided with two rectangular openings or slots, which receive removable mold or filling pieces 7—that is to say, the latter are in the form of rectangular and oblong bars, that extend the entire length of the mold, being supported and held in the openings in the ends 3 and adapted to be readily inserted and removed, as will be hereinafter further described.

As will be seen by inspection of Figs. 2, 3, and 5, these filling-pieces 7 are spaced from the sides 2 and also from the bottom and top of the mold-box, so that when the cementitious material is filled into the mold, as shown in Fig. 5, it fills the space on all sides of the pieces 7 save their ends, which, as shown, project beyond the end pieces 3 of the mold-box proper. These pieces 7 form longitudinal passages $x$ in the molded cement block. (See Fig. 7.) For the purpose of forming vertical or transverse passages $y\ y'$ in the said cement block we employ three vertical upright blocks 8 9 9, as shown in Figs. 1, 2, 3, and 4. These are secured to the base 1 by screw-bolts or other means (see Fig. 2) and arranged in alinement, but spaced apart in the longitudinal middle of the mold-box, and they are also spaced from the filling-pieces or longitudinal bars 7. It will be noted, however, that the upright blocks 9 are close to or in contact with the end pieces 3 of the mold-box. When the cementitious material is filled into the mold-box, it incloses the vertical sides of the central block 8 and also the vertical sides of the blocks 9 9 save their outer ones. It will be noted that the central block 8 has twice the width of the blocks 9 when measured in the direction of the length of the mold-box. Thus, as will be understood by reference to Fig. 7, the central transverse passage $y$ in the cement block has twice the dimension of the end slots or cavities $y'$.

It will be understood that when the mold is to be used the parts are held assembled in the position and relation illustrated in Figs. 1, 2, and 4 and that the cementitious material is filled into the spaces and tamped, as required, to form a firm compact mass, from which air is mainly excluded. It will be seen that the filling-pieces or longitudinal bars 7 form two parallel lengthwise passages $x$, running the entire length of the cement block, (shown in Fig. 7,) and that the blocks 8 9 9 form the central transverse or vertical passage $y$ and the vertical slots $y'$, that intervene the longitudinal passages. The cement block has a flat surface or face on each of its several sides. When a wall is formed, as shown in Fig. 9, by means of blocks thus molded, they are laid in course horizontally, so as to break joints—that is to say, they overlap each other, as usual in the case of bricks forming an ordinary brick wall. Thus when the blocks are placed end to end it is apparent that the end slots $y'$ form together a vertical passage, which is equal in dimension to the central passage $y$, so that ventilating-passages extend through the entire wall vertically and also longitudinally. It will be further seen that the blocks are produced with a comparatively small amount of material, but that the same is so distributed that the blocks have great strength. At the same time air-passages are provided for, as above stated. It other words, the block itself is very strong, and the wall produced has the same quality, while the blocks may be easily laid and their faces present a relatively large mortar-surface in proportion to the material used, and the weight of the bearing on the whole surface of the block is distributed equally or in such manner that the block has a great resisting quality. It will be seen that there is no solid part running clear across the block except the two binding-pieces across the top of the block between the perpendicular spaces, so that the wall is well adapted to exclude frost.

For the purpose of forming a thinner block, as represented in Fig. 8, which is particularly adapted for use as a facing or veneering for walls, we insert a thin metal plate 10 in the mold-box, the same being placed on opposite sides of the upright blocks 8 9 9, as shown in Figs. 4 and 5. It is apparent that this plate 10 prevents the cementitious material from entering the space between or coming in contact with the upright blocks 8 9 9, or, in other words, they form the inner sides of the two mold-boxes, which are exactly alike in form and dimensions, one of the filling-pieces or removable bars 7 constituting the center or core of the same. One or both of the plates 10 may be employed at a time, and it is obvious that the material is filled in around the filling piece or pieces 7 in the same way as before described, so that the product is a block which is relatively thin and provided with a longitudinal passage $x'$, as shown in Fig. 8, and without any end passages or slots. In order to remove the larger or smaller block from the mold, the nuts 5 of the rods 4 are loosened and the rods withdrawn from the notches 6, which allows the sides 2 to fall away or open laterally, as indicated by dotted lines, Fig. 5. The filling-pieces or longitudinal bars 7 are also withdrawn from the mold-box proper, (see arrows, Fig. 4,) and then by inverting the base-piece 1 the block or blocks are released from the mold.

In place of fitting the side pieces 2 into the grooves in the base in the base 1 they may be hinged, as indicated at 11 in Fig. 6, so as to turn outward, as shown by dotted lines in the said figure.

What we claim is—

1. The improved knockdown mold for building-blocks, comprising a base, sides, and ends, the latter having openings, longitudinal bars or filling-pieces adapted to be inserted and supported in said openings and spaced from the top, bottom, and sides of the mold, and upright blocks secured to the base and spaced apart and from the filling-pieces in the longitudinal middle of the mold, the two end blocks being located close to the ends of the mold-box, substantially as described.

2. The improved knockdown mold for building-blocks, comprising a base, sides, and ends which are provided with openings, longitudinal bars or filling-pieces adapted to be inserted in and withdrawn from said openings, and upright blocks secured to the base, and spaced apart and from the said filling-pieces, substantially as described.

3. The improved knockdown mold for building-blocks comprising a base, sides and ends, and means for holding them temporarily together, upright blocks secured to the base and arranged in alinement along the longitudinal middle of the mold-box, and a removable metal plate adapted to be placed in the mold-box, in parallel position and in contact with said upright blocks, and a longitudinal filling-piece held detachably in the ends of the mold-box, and spaced from the insertible plate and the sides and base of the mold-box, substantially as described.

BILLY ELY.
JAMES I. TAYLOR.

Witnesses:
M. G. ALLBRIGHT,
P. J. MILLER.